US009334940B2

(12) United States Patent
Neumann (10) Patent No.: US 9,334,940 B2
(45) Date of Patent: May 10, 2016

(54) POWERED AXLE DIFFERENTIAL (71) Applicant: DEERE & COMPANY, Moline, IL (US)

(72) Inventor: Clayton P. Neumann, Cedar Falls, IA (US)

(73) Assignee: Deere & Company, Moline, IL (US)

(*) Notice: Subject to any disclaimer, the term of this patent is extended or adjusted under 35 U.S.C. 154(b) by 84 days.

(21) Appl. No.: 14/291,846

(22) Filed: May 30, 2014

(65) Prior Publication Data

US 2015/0226300 A1    Aug. 13, 2015

Related U.S. Application Data (60) Provisional application No. 61/938,515, filed on Feb. 11, 2014.

(51) Int. Cl.
| F16H 37/06 | (2006.01) |
| F16H 48/19 | (2012.01) |
| B60K 1/00  | (2006.01) |
| B60K 17/16 | (2006.01) |
| F16H 48/16 | (2006.01) |
| F16D 41/06 | (2006.01) |

(Continued)

(52) U.S. Cl.
CPC ...... F16H 48/19 (2013.01); B60K 1/00 (2013.01); B60K 17/02 (2013.01); B60K 17/046 (2013.01); B60K 17/165 (2013.01); F16D 41/06 (2013.01); F16H 48/16 (2013.01); *B60K 2001/001* (2013.01); *B60Y 2200/148* (2013.01); *B60Y 2200/22* (2013.01); *Y10T 74/19005* (2015.01)

(58) Field of Classification Search
CPC ..... B60K 23/0808; B60K 17/08; F16H 37/08
USPC ................... 74/665 F, 665 G, 665 GA, 665 T
See application file for complete search history.

(56) References Cited

U.S. PATENT DOCUMENTS 1,366,805 A * 1/1921 Jex ........................ F16D 41/12
                                                    74/650
2,440,975 A * 5/1948 Robbins ................ F16H 48/147
                                                    74/650

(Continued)

FOREIGN PATENT DOCUMENTS

DE    3920934 A1    1/1991
DE    4205327 A1    9/1992

(Continued)

OTHER PUBLICATIONS

European Patent Office, Extended European Search Report in Application No. 15152062.4 dated Jun. 15, 2015.

*Primary Examiner* — Ha D Ho
(74) *Attorney, Agent, or Firm* — Ingrassia, Fisher & Lorenz PC (57) ABSTRACT

A power transfer assembly is described for power transmission from a power source to one or more rotating components. The power transfer assembly includes a power source capable of providing torque output, a first one-way clutch configured to receive torque input from the power source, and a second one-way clutch configured to receive torque input from the power source. The first one-way clutch is configured to transmit at least a first portion of the received torque input to a first half-axle. The second one-way clutch is configured to transmit at least a second portion of the received torque input to a second half-axle.

20 Claims, 7 Drawing Sheets (51) Int. Cl.
*B60K 17/02* (2006.01)
*B60K 17/04* (2006.01)

(56) References Cited

U.S. PATENT DOCUMENTS

| | | | |
|---|---|---|---|
| 3,154,162 A | 10/1964 | McCaleb et al. | |
| 3,913,697 A | 10/1975 | Greene | |
| 4,373,407 A | 2/1983 | Okubo | |
| 4,762,191 A | 8/1988 | Hagin et al. | |
| 7,493,998 B2 * | 2/2009 | Irikura | F16D 41/088 192/38 |
| 7,588,508 B2 | 9/2009 | Marsh et al. | |
| 8,365,636 B2 * | 2/2013 | Irikura | F16H 48/16 74/650 |

FOREIGN PATENT DOCUMENTS

| | | |
|---|---|---|
| GB | 1305572 A | 2/1973 |
| WO | 2013050835 A1 | 4/2013 |

* cited by examiner

POWERED AXLE DIFFERENTIAL

CROSS-REFERENCE TO RELATED APPLICATION(S)

This application claims priority to provisional application No. 61/938,515 filed on Feb. 11, 2014.

STATEMENT OF FEDERALLY SPONSORED RESEARCH OR DEVELOPMENT

Not applicable.

FIELD OF THE DISCLOSURE

This disclosure relates to vehicle drivetrains, including drivetrains of powered trailer axles.

BACKGROUND OF THE DISCLOSURE

In order to transmit power from a power source (e.g., an engine or an electric motor) to the wheels (or other elements) of a particular vehicle, various types of drivetrains may be employed. For example, various gear reductions (or other gearing configurations) of known configurations may be interposed between the power source and the relevant wheel (or wheels) in order to appropriately convert the rotation/torque from the power source into useful rotation/torque at the wheels. Similarly, in certain vehicles, a differential of one of various known configurations may be utilized in order to permit wheels oriented along a shared axis to rotate at different angular velocities, even though the wheels may both draw power from the same power source. Such a differential may, for example, assist in avoiding unwanted slippage of one or both wheels when the vehicle negotiates a turn or when different wheels are exposed to different traction conditions (e.g., when one wheel is located on a slippery surface, but the other wheel is not). In simple form, such a differential may include, for example, a pinion gear attached to an input shaft (e.g., a shaft that is mechanically (or otherwise) coupled to the relevant power source), which pinion gear may drive a ring (or "crown") gear. The ring gear may itself transmit torque via an attached carrier or cage to one or more side gears and thereby to the axle shafts (e.g., to gears attached, respectively, to two axle half-shafts). In this way, not only may torque be transmitted from the input shaft to two distinct axle half-shafts, but the half-shafts may also rotate at different angular velocities, which may be beneficial, for example, if the vehicle is executing a turn. In certain configurations, such geared (or other) differentials may also be configured to affect the relative amount of torque transmitted to each respective half-shaft.

In certain instances, various enhancements and alternative configurations of the above-noted simple differential may be utilized. For example, in certain drivetrain configurations, a locking differential may be utilized. A locking differential may be a mechanical device (or configuration), for example, that may force both axles associated with a differential to rotate at the same speeds, when appropriate, even if the wheels are exposed to different traction conditions.

Although the use of differentials in vehicle applications is widespread, in certain circumstances their complexity, size, weight, and/or cost may be viewed as disadvantages. For example, in the context of a powered trailer axle, it may be impractical, economically inadvisable, or otherwise undesirable to utilize a traditional differential to control distribution of rotation/torque to the axle wheels. Further, particularly when employed in trailers (or other towed configurations), the use of a differential may require disengagement of a friction element or shift collar in order to prevent damage to the power source due to overspeed (e.g., as may tend to occur when the speed of a towing vehicle exceeds the maximum speed at which the relevant power source can drive the axle). This may also increase complexity, cost (including maintenance cost), and so on. Similarly, locking differentials may exhibit various disadvantages including the need, in certain configurations, to engage or disengage a differential lock friction element or shift collar in order to activate or deactivate the mechanism.

In light of these and other issues, therefore, it is desirable to implement a new system that, among other advantages, allows an outside wheel to turn faster than an inside wheel during a turning operation, automatically disconnects an axle from a power source when vehicle speed exceeds the speed at which the power source can drive the axle, and provides automatic differential lock when the vehicle is traveling in a straight line.

SUMMARY OF THE DISCLOSURE

A system is disclosed for transmission of power from a power source to a vehicle axle, including an axle composed of two half-axles.

According to one aspect of the disclosure, a power transfer assembly for transmitting power from a power source to a rotating component includes a power source capable of providing torque output. A first one-way clutch is configured to receive torque input from the power source. A second one-way clutch is configured to receive torque input from the power source. The first one-way clutch is further configured to transmit at least a first portion of the received torque to a first half-axle. The second one-way clutch is further configured to transmit at least a second portion of the received torque input to a second half-axle.

According to another aspect of the disclosure, a work vehicle includes a power source capable of providing torque output. A first one-way clutch in the work vehicle is configured to receive torque input from the power source. A second one-way clutch in the work vehicle is configured to receive torque input from the power source. The first one-way clutch is further configured to transmit at least a first portion of the received torque to a first half-axle. The second one-way clutch is further configured to transmit at least a second portion of the received torque input to a second half-axle.

One or more of the following features may also be included. At least one gear reduction may be interposed between the power source and the first and second one-way clutches, the torque input being transmitted to the first and second one-way clutches via the at least one gear reduction. One or both of the first and the second one-way clutches may include a sprag clutch. The first and second one-way clutches may also include a shared input race of a sprag clutch, the shared input race being configured to receive torque input from the power source and transmit the torque input to both a first output race included in the first one-way clutch and a second output race included in the second one-way clutch.

The power source may include an infinitely variable prime mover. There may be no differential, other than the first and the second one-way clutches, interposed between the power source and either of the first and the second half-axles for the transmission of power from the power source to either of the first and the second half-axles. The first and the second half-axles may form part of a powered trailer axle.

At least one of the first and the second one-way clutches may include a mechanical diode. Each of the first and the second one-way clutches may include a mechanical diode. The first and second one-way clutches may include a shared input ring of a mechanical diode, the shared input ring being configured to receive torque input from the power source and transmit the torque input, at least in part, to both a first output ring included in the first one-way clutch and a second output ring included in the second one-way clutch.

The details of one or more implementations are set forth in the accompanying drawings and the description below. Other features, implementations, and advantages will become apparent from the description, the drawings, and the claims.

BRIEF DESCRIPTION OF THE DRAWINGS

Like reference symbols in the various drawings indicate like elements.

DETAILED DESCRIPTION

The following describes one or more example embodiments of the disclosed system and vehicle, as shown in the accompanying figures of the drawings described briefly above. Various modifications to the example embodiments may be contemplated by one of skill in the art.

Figure 1:
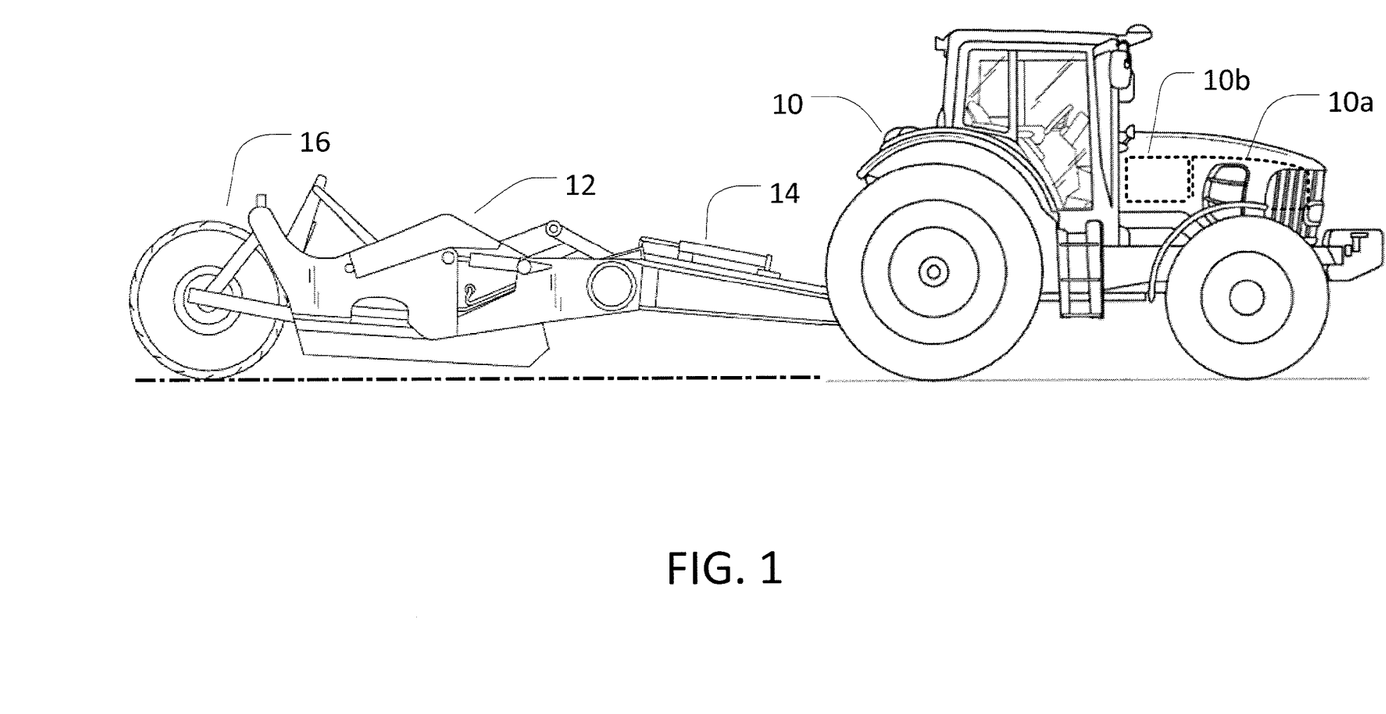
FIG. 1 is a side view of an example vehicle train with respect to which the disclosed system may be implemented.

The disclosed system (or vehicle) may be used advantageously in a variety of settings and with a variety of power sources and/or vehicle types, including internal combustion engines, electrical machines, hydrostatic drives, and so on, and work vehicles for agricultural, construction, forestry, and various other applications. Referring now to FIG. 1, for example, work vehicle 10 is depicted as a tractor with a powered scraper trailer 12. Trailer 12 may be connected to work vehicle 10 using various known configurations, which may include power transmission devices 14 for the transmission of hydraulic, electrical, mechanical, and/or other power from work vehicle 10 to trailer 12.

Power transmission devices 14 may be configured in various known ways, including with cables for transmission of electrical power, hydraulic lines for the transmission of hydraulic fluid/pressure, mechanical devices for the transmission of mechanical power (e.g., rotating shafts for the transmission of torque), and so on. In certain embodiments, it may be preferable to utilize electrical and/or hydraulic power transmission, as it may be simpler to transmit electric/hydraulic power from work vehicle 10 over power transmission devices 14 to trailer 12. For example, work vehicle 10 may include an internal combustion engine (e.g., engine 10a), which may be utilized (e.g., in cooperation with a generator and/or hydraulic pump, such as generator 10b included in work vehicle 10) to generate electrical and/or hydraulic power, which may then be transmitted to trailer 12 via electrical/hydraulic lines included in power transmission devices 14. However, other configurations may also be advantageous in certain embodiments, including, for example, configurations permitting the transmission of mechanical power (e.g., by rotating shafts or mechanical linkages) from work vehicle 10 to trailer 12.

Notably, it will be understood from the discussion herein that the disclosed system may be implemented on a variety of vehicles and/or vehicle trains, including vehicles and/or vehicle trains differing from those depicted in FIG. 1. For example, the system may be implemented on a vehicle train similar to that depicted in FIG. 1, in which a primary power source (e.g., internal combustion engine 10a coupled with a generator 10b) may be located on work vehicle 10, and from which power may be transmitted to powered axle assembly 16 via power transmission devices 14. Additionally/alternatively, the system may be implemented on a single vehicle platform (e.g., only on work vehicle 10, only on trailer 12, and so on). In such a configuration, for example, power transmission devices 14 may not be required, as there may be no need to transfer power from one platform (e.g., work vehicle 10) to another platform (e.g., trailer 12). As such, the term "vehicle," as used herein, may refer to a single platform such as work vehicle 10 or trailer 12, a vehicle train including multiple platforms (e.g., as depicted in FIG. 1), or any variety of other platforms that utilize rotary power for locomotion.

Similarly, although specific examples may be discussed herein, terms such as "engine," "motor," "prime mover," and so on to are not intended to be limited to a particular engine/motor/mover or engine/motor/mover type. Further, it will be understood that the system described may be implemented through configuration of a vehicle during manufacture and through retrofit of a pre-existing vehicle.

In certain embodiments, trailer 12 (or another platform or vehicle) may include powered axle assembly 16. Axle assembly 16 may, for example, receive torque input from an electrical machine located on trailer 12 (not shown, in FIG. 1), which may, for example, receive electrical power via electrical cables included in power transmission devices 14.

Figure 2:
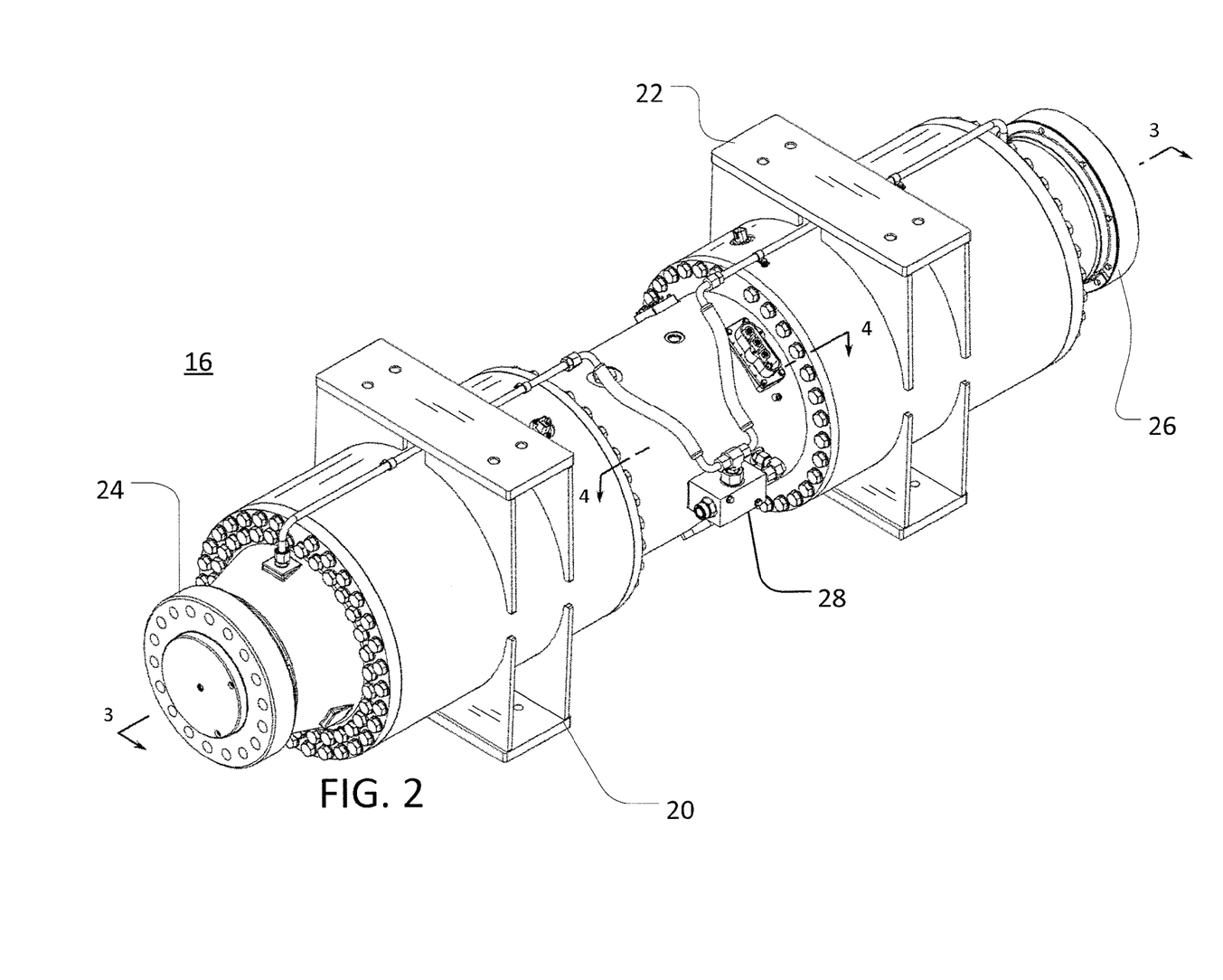
FIG. 2 is a perspective view of an example powered axle associated with the example vehicle train of FIG. 1.

Referring now also to FIG. 2, powered axle assembly 16 may exhibit various configurations. For example, axle assembly 16 may include mounting brackets 20 and 22, which may facilitate fixably mounting axle assembly 16 on trailer 12. Axle assembly 16 may also include, for example, one or more power input assemblies (of various known configurations) which may receive power from an external prime mover (e.g., electrical generator 10b included on work vehicle 10) and relay the received power (e.g., via conduit 28) to various apparatus internal to axle assembly 16. Axle assembly 16 may further be configured with apparatuses (e.g., rotatably mounted wheel hubs 24 and 26) for mounting wheels (not shown) or other devices (e.g., one or more sprockets for use with a track-drive system) (not shown).

In certain embodiments, trailer 12 may be a scraper, for moving dirt or other material (as depicted, for example, in FIG. 1). The use of powered axle assembly 16 in such a configuration may be useful, for example, because the additional draft of powered axle assembly 16 may improve the operational performance of the scraper. It will be understood, however, that other configurations are also possible. For example, the system described herein may additionally/alternatively be implemented with respect to grain carts, commodity carts, sugar cane carts, slurry tankers, pull-type sprayers, dry box spreaders, pull-type scrapers, and so on.

Figure 3:
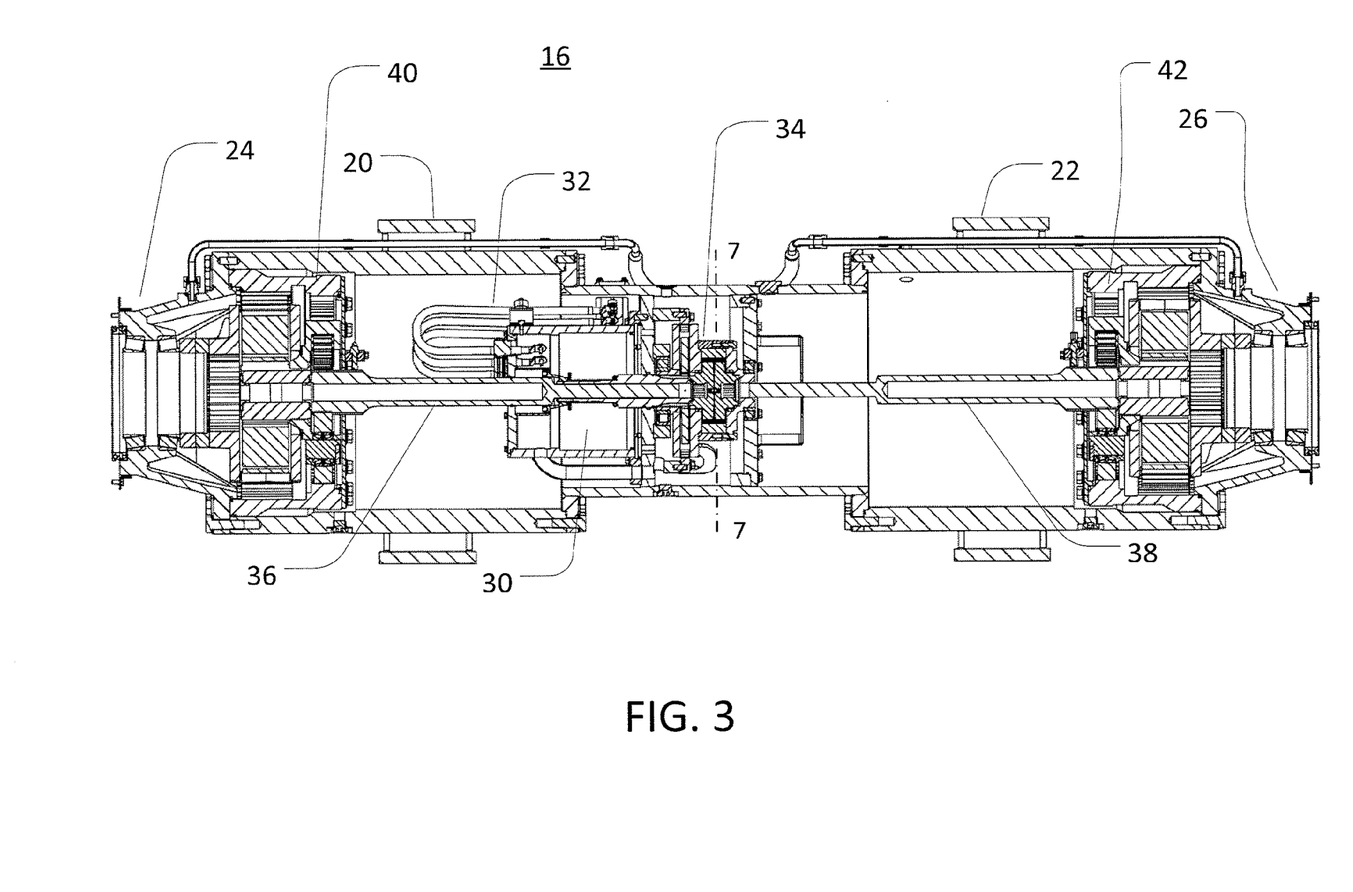
FIG. 3 is a sectional view taken along line 3-3 in FIG. 2 of interior mechanisms of the example powered axle of FIG. 2.

Referring now also to FIG. 3, a sectional view of axle assembly 16 is presented, taken along plane 3, as indicated in FIG. 2. In certain embodiments, axle assembly 16 may include electrical machine 30, which may receive three-phase power via conduits 32. Electrical machine 30, when powered, may generate torque for driving the rotation, for example, of wheel hubs 24 and 26. Such torque, for example, may be transmitted via clutch assembly 34 to half-axles 36 and 38 and, thereafter, to wheel hubs 24 and 26. In certain embodiments, gear reduction devices (e.g., planetary gear reductions 40 and 42) may be provided between clutch assembly 34 and wheel hubs 24 and 26 (e.g., at the outside ends, respectively, of half-axles 36 and 38), in order to ensure that appropriate speed/torque is provided to the wheels/sprockets/etc. of trailer 12. Axle shafts (not shown in FIG. 3) may also be included at wheel hubs 24 and 26.

As also discussed above, in certain embodiments a power source other than (or in addition to) electrical machine 30 may be provided. For example, axle assembly 16 may be equipped with a hydrostatic drive system, an internal combustion engine, another infinitely variable prime mover, and/or a mechanical assembly for transmission of rotational power from an external prime mover (e.g., internal combustion engine 10a mounted in work vehicle 10).

Figure 4:
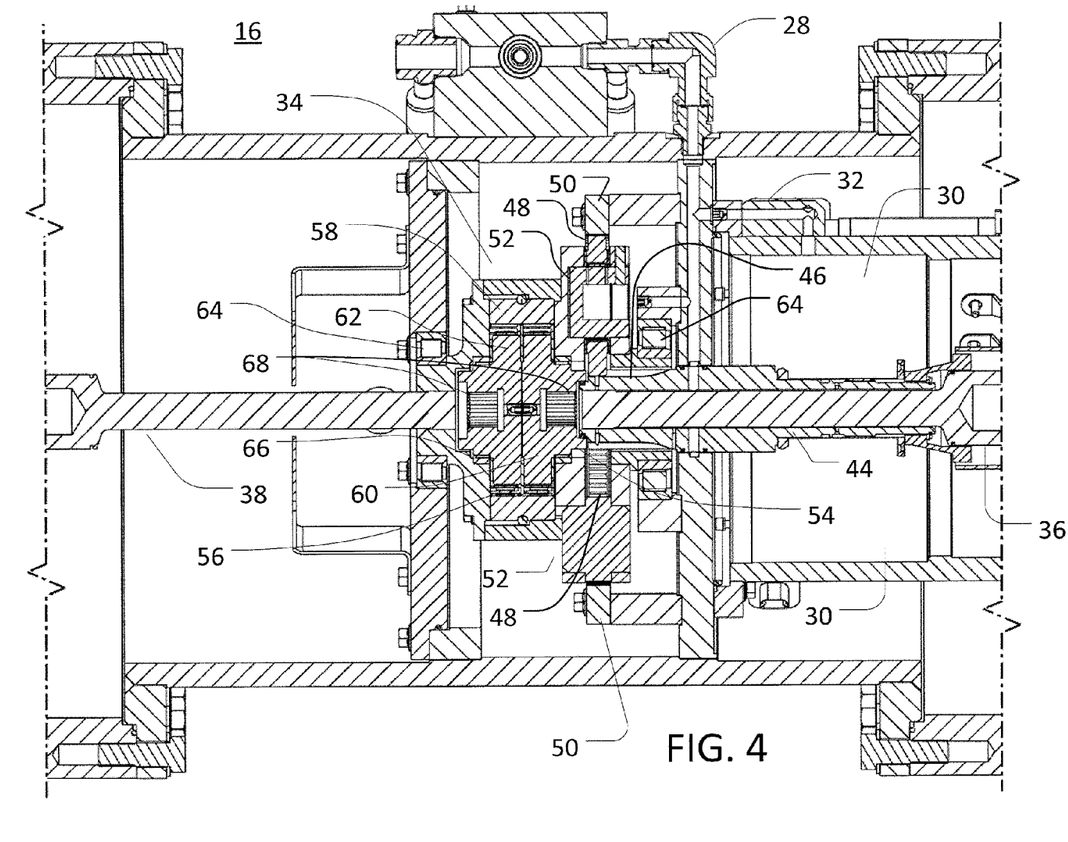
FIG. 4 is an enlarged partial sectional view taken along line 4-4 in FIG. 2 showing an example clutch assembly in the example powered axle of FIG. 2.

Referring now also to FIG. 4, a more detailed sectional view of a portion of powered axle assembly 16 is presented, taken along plane 4, as indicated in FIG. 2.

As also noted above, axle assembly 16 may include electrical machine 30 (and/or another power source capable of generating torque), in mechanical (or other power-transmitting) communication with half-axles 36 and 38 via clutch assembly 34. In certain embodiments, a gear reduction may be interposed between electrical machine 30 and clutch assembly 34. (It will be understood that "between," as used herein with respect to power transmission, is not intended to necessarily indicate physical orientation. For example, although it may be advantageous to locate successive power transmission assemblies/devices in direct physical succession (with respect to the path of power transmission), it may be possible to locate successive power transmission assemblies/devices in other physical orders or arrangements.) For example, sun shaft 44 may be rotationally fixed to an output of electrical machine 30, such that torque output from electrical machine 30 may cause sun shaft 44 to rotate. As depicted in FIG. 4, sun shaft 44 may be a hollow shaft, through which half-axle 36 runs. However, alternative configurations may be possible. Sun shaft 44 may in turn be rotationally fixed to sun gear 46, which may itself be meshed with planet gears 48. Planet gears 48 may be meshed with ring gear 50, which may be rotationally fixed with respect to axle assembly 16. As such, torque generated by electrical machine 30 may cause sun shaft 44 and sun gear 46 to rotate. This may accordingly, due to fixed ring gear 50, cause planet gears 48 to rotate around sun gear 46, which may in turn cause plant gear carrier 52 to rotate in a corresponding manner. Planet gear carrier 52 may be configured to transmit this rotation to clutch assembly 34.

Clutch assembly 34 may include one-way clutches 54 and 56, which may receive torque input from electrical machine 30 (e.g., via planet gear carrier 52 of the planetary gear reduction, as noted above) and may transmit, respectively, a portion of this torque input to half-axles 36 and 38 (e.g., via a splined connection between the inner portion of clutches 54 and 56 and, respectively, half-axles 36 and 38). One-way clutches may exhibit a variety of configurations, as is known in the art (e.g., sprag clutches, mechanical diodes, and so on), and may facilitate the transmission of rotational power in one rotational direction (e.g., clockwise) to a particular rotating element, while permitting free rotation of the rotating element in the other rotational direction (e.g., counterclockwise). As such, when rotational power is provided to a one-way clutch in a power-transmitting rotational direction, rotational power may be transmitted through the clutch to an output shaft (or other component/assembly). In contrast, when rotational power is provided to a one-way clutch in the non-power-transmitting rotational direction, rotational power may not be transmitted through the clutch to the output shaft (or other component/assembly).

In certain embodiments, one-way clutches 54 and/or 56 may include a sprag clutch. A sprag clutch, as is known in the art, may typically include a rotatable outer race and a rotatable inner race, with "sprags" providing a mechanical connection between the inner and outer races. In certain configurations, the sprags may further be nested in one or more spring cages running between the inner and outer races. Each of the sprags may be configured to pivot around an individual axis and may be shaped such that when a first of the races (e.g., an outer race) is rotated in one direction, with relation to the second race, the sprags physically engage both races, thereby transmitting force from the first race to the second, and causing the second race (e.g., an inner race) to rotate in the same direction as the first (i.e., transmitting rotational power from the first to the second race). Accordingly, rotational power may be transmitted, in this rotational direction, from an input power source, through the first and the second race, to a component/assembly that is rotationally fixed to the second race. However, when the first race is rotated in the opposite direction, the sprags may pivot away from the races, thereby preventing transmission of rotational power from the first race to the second race and allowing the first race to rotate relatively freely, with respect to the second race.

In certain embodiments, a one-way clutches 54 and/or 56 may include a mechanical diode. A mechanical diode, as is known in the art, may include two rotatable "rings," with various rigid struts oriented between the rings. One of the rings may be considered a "pocket" ring, and may exhibit pockets in each of which one end of a rigid strut may be translationally (i.e., circumferentially, with respect to the ring) fixed. The rigid struts, although translationally fixed, may be free to rotate or pivot about the fixed end, to varying degrees, and may be biased to rotate away from the pocket ring (e.g., through spring-loading). The other ring of the diode, accordingly, may be a "notch" ring, and may exhibit various notches respectively configured to receive a portion of the various struts (e.g., a portion of a strut opposite the strut's fixed end). The two rings may be configured such that if the notch ring (e.g., an outer ring of the diode) rotates in one direction with respect to the pocket ring (e.g., an inner ring of the diode) the biased struts engage with the notches and thereby permit the transmission of rotational power between the rings. The rings may also be configured such that if the notch ring rotates in the opposite direction with respect to the pocket ring the biased struts are forced to rotate away from the notch ring (i.e., toward the pocket ring) and do not engage with the notches so as to permit transmission of rotational power between the rings. As such, when the notch ring rotates in the opposite direction, the pocket ring may be free to spin (or not spin) independently of the notch ring.

Notably, although the above discussion of sprag clutches and mechanical diodes is framed in part with the first race/notch ring as an outer portion of the one-way clutch and the second race/pocket ring as an inner portion of the one-way clutch, it will be understood that alternative configurations may be possible. For example, the first race/notch ring may be the inner portion of a one-way clutch and the second race/pocket ring may be the outer portion of the one-way clutch. Further, it will be understood that one-way clutches (including, for example, sprag clutches and mechanical diodes) may effectively operate regardless of which race/ring/component receives a power input. For example, in certain embodiments an outer race of a sprag clutch may be configured to receive rotational power from a prime mover and to transmit such power to an inner race of the clutch (which may, for example, be coaxial with and rotationally fixed with respect to a half-axle) when the outer race is rotated in a clockwise direction. As such, if the outer race is rotated in a counter-clockwise direction, rotational power may generally not be transmitted from the outer race to the inner race. (It will be understood that the force transmitted between races of a sprag clutch may not actually be zero in such a configuration, due to frictional forces between the pivoting sprags and the two races. This may likewise be true, for example, for mechanical diodes, due to the frictional forces between the struts and the notch ring.) Further, in the above-described configuration, if rotational power is provided to the inner race (e.g., if a vehicle is coasting downhill, causing an axle connected to the inner race to rotate at a faster angular velocity than can be provided by the relevant vehicle power source), such power may generally be transmitted from the inner race to the outer race only if the inner race moves in a counter-clockwise direction, with respect to the outer race. In other words, for example, if a one-way clutch is utilized to provide forward moving power from a prime mover to an axle, rotational power may not be substantially transferred via the axle to the prime mover unless the axle is rotating backwards. (As noted above, in certain embodiments, a reduced amount of rotational power may still be transferred in a powered clockwise rotation of the inner race, due to frictional forces between the pivoting sprags and the two races).

It will be understood that a similar discussion may also be applicable to mechanical diodes as well, with, for example, the notch and pocket rings being considered in place of the outer and inner races. Further, it will be understood, for example, that similar principles may apply if the prime mover is connected to the inner race/ring, and an associated outer race/ring is connected to a half-axle (although this configuration may be less common than the reverse arrangement, which is primarily discussed herein).

Still referring to FIG. 4, and as noted above, clutch assembly 34 may include one-way clutches 54 and 56, which may be configured, respectively, to transmit one-directional rotational power from electrical machine 30 (e.g., via the above-noted planetary gear reduction) to half-axles 36 and 38. As also noted above, clutches 54 and 56 may include sprag clutches, mechanical diodes, and/or various other types of one-way clutch.

In certain embodiments, clutches 54 and 56 may both utilize shared outer race/ring 58, which may be in mechanical communication (e.g., via sprags or mechanical diode struts) with both of inner races/rings 60 and 62. Accordingly, for example, shared outer race/ring 58 may receive (directly or indirectly) rotational power from electrical machine 30 and may transmit this power to the two distinct inner races/rings 60 and 62. For example, outer race/ring 58 (which may be considered, in this configuration, an "input element" of the one-way clutch), may be mechanically connected, in various known ways, with planet gear carrier 52, which may rotate in response to torque from electrical machine 30 (as described in greater detail above). Correspondingly, depending on the rotational direction of the input rotation/torque and the configuration of clutches 54 and 56, outer race/ring 58 may receive rotational power from planet gear carrier 52 and transmit the received rotational power to inner races/rings 60 and 62. Inner races/rings 60 and 62 may then (directly or indirectly) transmit that power to half-axles 36 and 38.

Figure 5:
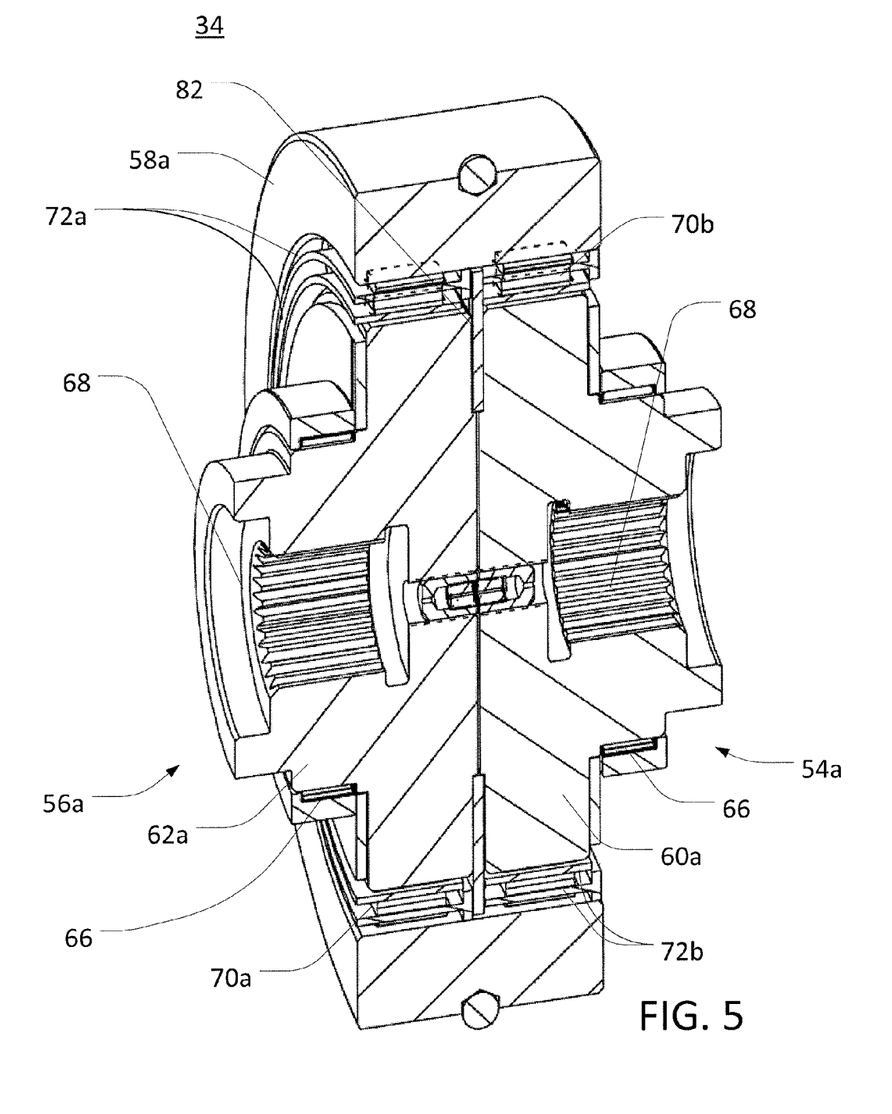
FIG. 5 is a perspective cut-away view showing an example clutch assembly having a sprag clutch arrangement.
Figure 6:
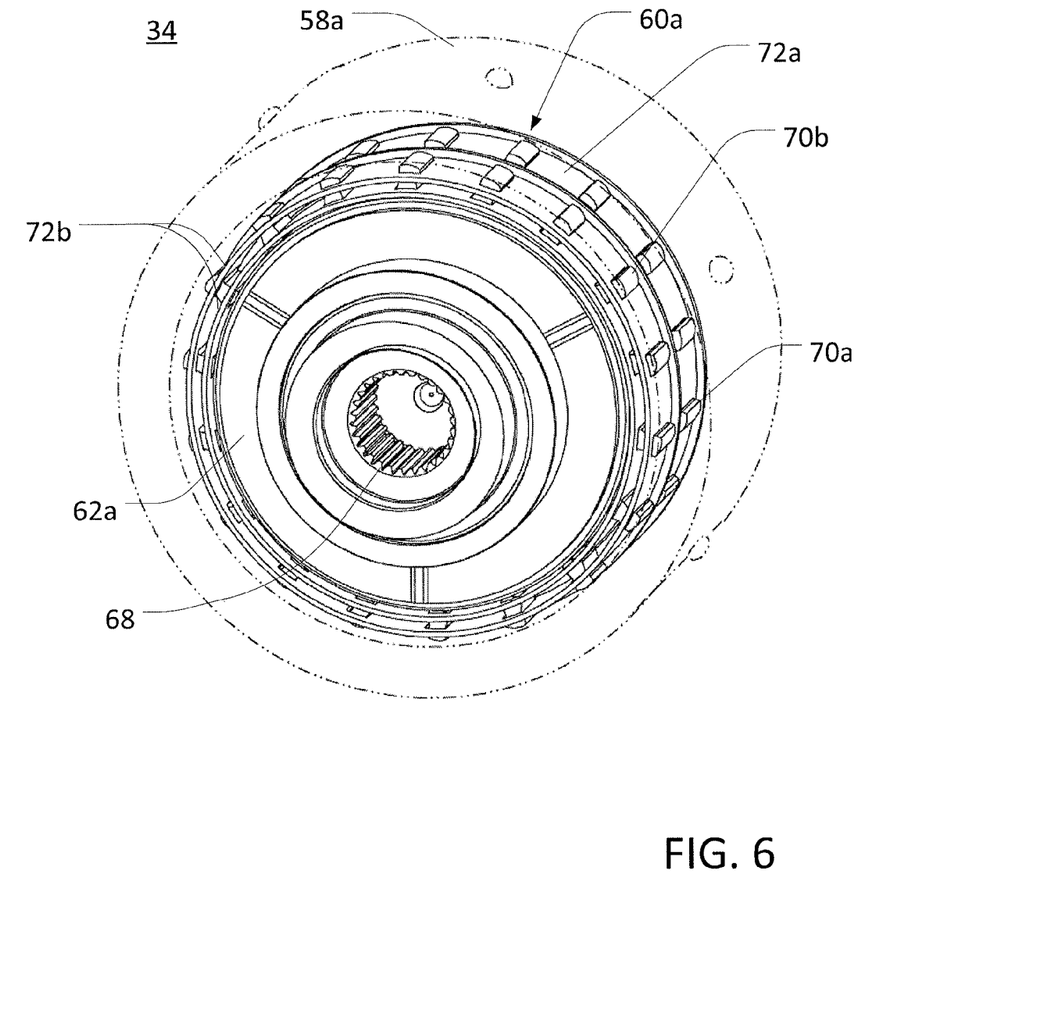
FIG. 6 is a perspective view of interior mechanisms of the clutch assembly of FIG. 5.

Referring now also to FIG. 5 and FIG. 6, a more detailed rendering of one of the configurations of clutch assembly 34, as described above, is depicted. For example, clutch assembly 34 may include one-way clutches 54 and 56, which may be sprag clutches 54$a$ and 56$a$ (as depicted in FIG. 5 and FIG. 6). These two one-way clutches may respectively include, for example, distinct inner races 60$a$ and 62$a$ (i.e., the output elements, respectively, of the two clutches), as well as shared outer race 58$a$ (i.e., the shared input element of the two clutches). Various sprags (e.g., 70$a$ and 70$b$) may be distributed, respectively, in the space between outer race 58$a$ and inner races 60$a$ and 62$a$, along with spring cages 72$a$ and 72$b$, which may act to hold in place and/or appropriately bias sprags 70$a$ and 70$b$, respectively. Accordingly, rotational power may be transmitted, via planetary gear carrier 52, from electrical machine 30 to outer race 58$a$. Provided the transmitted rotation is in the power-transferring direction of clutch assembly 34, the rotational power may further be transmitted via sprags 70$a$ and 70$b$ to inner races 60$a$ and 62$a$ and then to half-axles 36 and 38, respectively. It will accordingly be understood that, in order to drive half-axles 36 and 38 in the same direction, in certain embodiments clutches 54 and 56 (e.g., configured as clutches 54$a$ and 56$a$) may be oriented such that rotation of outer race 58 in one direction transmits rotational power to both inner races/rings 60 and 62, whereas rotation of outer race 58 in the other direction may cause inner races/rings 60 and 62 to slip (i.e., not receive substantial rotational power from outer race 58).

As depicted in detail in FIG. 5 and FIG. 6, in certain embodiments clutches 54$a$ and 56$a$ may include shared outer race 58$a$, distinct inner races 60$a$ and 62$a$, and separate sprag assemblies arranged, respectively, between outer race 58$a$ and inner races 60$a$ and 62$a$. For example, sprags 70$a$, along with spring cages 72$a$, may be interposed between outer race 58$a$ and inner race 62$a$ and sprags 70$b$, along with spring cages 72$b$, may be interposed between outer race 58$a$ and inner race 60$a$. In certain embodiments, accordingly, sprags 70$a$ (and spring cages 72$a$) may be configured to operate independently of sprags 70$b$ (and spring cages 70$b$), facilitating the independent transfer of rotational power from outer race 58$a$ to inner races 60$a$ and 62$a$, respectively. Such a configuration may be clearly seen, for example, in FIG. 6, in which outer race 58$a$ is depicted as transparent in order to show the separate sprag assemblies associated with inner races 60$a$ and 62$a$ (i.e., sprags 70$a$ within spring cages 72$a$, and sprags 70$b$ within spring cages 72$b$, respectively).

Figure 7:
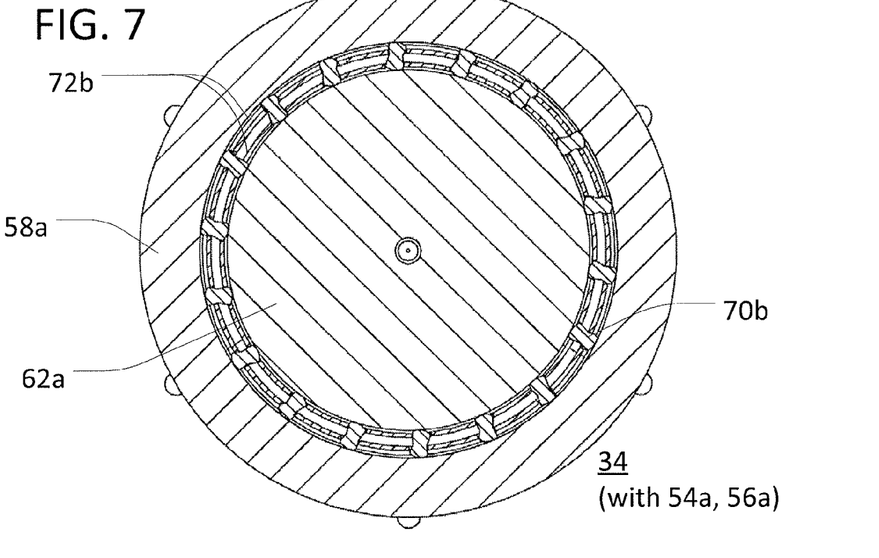
FIG. 7 is a sectional view taken along line 7-7 in FIG. 3 of interior mechanisms of the clutch assembly of FIG. 5.

These various features may also be viewed in FIG. 7, which presents a sectional view of clutch assembly 34, in an embodiment utilizing sprag clutches 54$a$ and 56$a$ (hidden, in FIG. 7), along line 7-7 of FIG. 3 (i.e., a cross-section of clutch assembly 34 running through inner race 62$a$).

Figure 8:
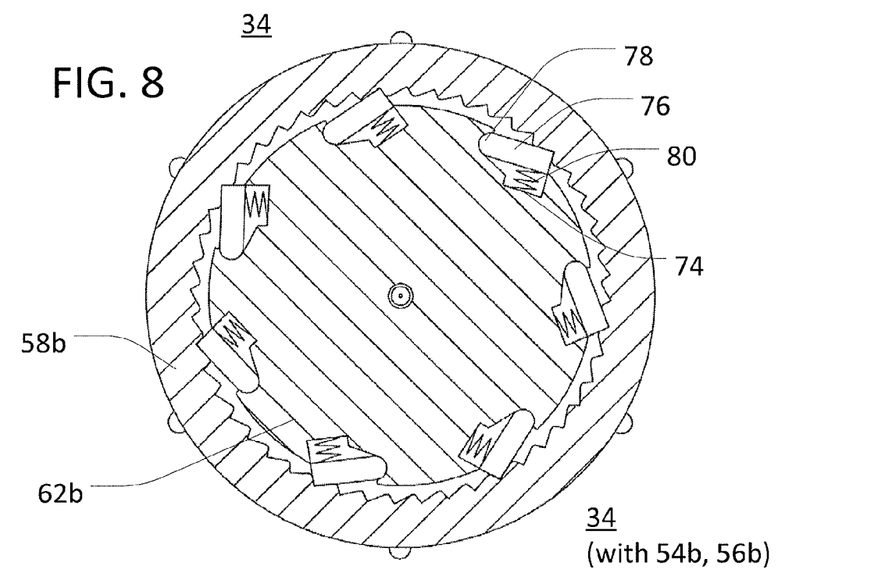
FIG. 8 is a sectional view taken along line 7-7 in FIG. 3 of an example clutch assembly having a mechanical diode arrangement.

Referring now also to FIG. 8, a similar cross section of clutch assembly 34 is presented, with the clutch assembly including mechanical diodes 54$b$ and 56$b$ rather than sprag clutches 54$a$ and 56$a$. In certain embodiments, as also noted above, mechanical diodes 54$b$ and 56$b$ (hidden, in FIG. 8) may share single outer ring 58$b$, which may be configured with a number of notches around its inner circumference. Mechanical diodes 54$b$ and 56$b$ may additionally have distinct inner rings (e.g., inner rings 60$b$ (hidden, in FIG. 8) and 62$b$, respectively), which may be configured to independently receive rotational force from outer ring 58b. For example, inner ring 62b (as well as inner ring 60b) may be configured with a number of pockets (e.g., pocket 74), which may respectively house rigid struts (e.g., strut 76). These struts may be pivotably anchored with respect to the pockets (e.g., at pivot point 78 of strut 76) and may be biased outwardly by various springs (e.g., spring 80). Further, although not explicitly depicted in FIG. 8, it will be understood based on the discussion herein, that inner ring 60b may be similarly configured with notches, springs and struts so as to permit inner ring 60b to similarly interact with shared outer ring 58b. Accordingly, due to the interaction between the spring-biased struts and the inner and outer rings, rotational force may be transferred between shared outer ring 58b and distinct inner rings 60b and 62b in one rotational direction, but not another. Further, as described with respect to inner races 60a and 62a, above, such rotational force may be independently transferred from outer ring 58b to inner rings 60b and 62b, respectively.

As also depicted in FIG. 5 and FIG. 6, for example, in certain embodiments clutches 54 and 56 (e.g., clutches 54a and 56a) may be arranged in a back-to-back configuration. For example, where half-axles 36 and 38 are aligned along a shared axis of rotation, clutches 54a and 56a may also be aligned along the same axis of rotation, with the output portions of the clutches (e.g., splined connections 68) facing, respectively, in opposite directions along the shared rotational axis. In certain embodiments, spacers of various configurations (e.g., spacer 82) or other components may be disposed between inner surfaces of inner races 60a and 62a.

It will be understood that the various components and assemblies described herein may be appropriately secured/mounted in axle assembly 16 (or in another relevant assembly or platform) using various known means. For example, rotation of various elements may be permitted via bearings 64 and 66 (and/or various other bearings), power may be transmitted between rotating elements via splined shafts of know configurations (e.g., at splined connections 68), various intermeshing of gears, or other known connections, and so on. Further, it will be understood that power may be transmitted by clutch assembly 34 to half-axles 36 and 38 (or other appropriate components) directly or indirectly, in keeping with this disclosure. For example, output components of clutches 54 and 56 (e.g., output rings/races 60 and 62) may be directly connected, respectively, to half-axles 36 and 38 via splined (and/or other) connections (e.g., splined connections 68). Additionally or alternatively, such output components may be indirectly connected, respectively, to half-axles 36 and 38. For example, in certain embodiments various gear reductions or other drivetrain components may be interposed between clutches 54 and 56 and, respectively, half-axles 36 and 38.

As also noted above, it will also be understood, in light of the discussion herein, that various configurations may be possible other than those explicitly presented as examples. For example, one-way clutches 54 and 56 may take a variety of forms, as is known in the art, and need not necessarily include sprag clutches or mechanical diodes. As such, in certain embodiments, clutches 54 and 56 may not necessarily exhibit an inner and outer race/ring exactly as depicted in, for example, FIG. 4. Nevertheless, it will be understood that the principles discussed above may still be applicable to these (and other) alternative configurations. For example, from a general perspective, with respect to clutch assembly 34, it may be beneficial to utilize a single, shared input mechanism or assembly to receive, at both clutches 54 and 56, rotational power from electrical machine 30 (or another prime mover), while also utilizing separate output mechanisms or assemblies, as part of clutches 54 and 56, respectively, which may receive power from the input mechanism/assembly and transmit the received power to separate, respective half-axles. As presented above, the shared input mechanism/assembly for clutches 54 and 56 may be represented by outer ring/race 58, and the separate output mechanisms/assemblies may be represented by inner rings/races 60 and 62. However, in certain embodiments, for example, one-way clutches 54 and 56 may share a single inner ring/race configured to receive power from a prime mover, with each of the clutches having a distinct outer ring/race configured to provide the received power to an associated half-axle (or other powered component). Likewise, various other configurations may be appreciated by one of skill in the art.

As also noted above, the use of the various configurations described herein (and similar other configurations, as will be apparent to those of skill in the art in light of the principles and examples discussed herein) may be advantageous for a number of reasons. For example, the use of one-way clutches 54 and 56 as part of clutch assembly 34 may permit trailer 12 (or another relevant vehicle) to be towed in a forward direction without back driving electrical machine 30 (or another relevant prime mover). For example, if one-way clutches 54 and 56 are sprag clutches and are configured to transmit forward-driving power from electrical machine 30 to half-axles 36 and 38, towing trailer 12 forward (e.g., without activating or otherwise appropriately engaging electrical machine 30) may cause the sprags to pivot to a non-torque-carrying orientation, thereby allowing inner races 60 and 62 to overrun outer race 58 (and electrical machine 30). In this way, for example, trailer 12 may be towed in an unpowered (or underpowered) mode without back-driving electrical machine 30.

Subsequently, for example, in order to engage electrical machine 30, an operator (and/or an operating computer, controller, or logical circuit) may speed-match electric machine 30 to half-axles 36 and 38 (taking account, for example, of the potential speed reduction associated with the planetary gear reduction of FIG. 4), thereby allowing the application of torque from electrical machine 30 to half-axles 36 and 38, via clutch assembly 34. Assuming straight travel, all races (i.e., shared outer race 58 and inner races 60 and 62) may then rotate at the same rotational velocity, with torque being distributed to half-axles 36 and 38 in relation to the traction associated, respectively, with those half-axles. Notably, where the relevant vehicle—e.g., trailer 12—is heavy, the traction associated with the half-axles may tend to be approximately equal, in which case the torque may tend to be distributed approximately equally.

As another advantage, clutch assembly 34 (via one-way clutches 54 and 56) may act as an effective differential by permitting trailer 12 to negotiate turns without wheel slippage. This is because the one-way clutch associated with the outer wheel (e.g., clutch 54) may permit that outer wheel and the associated half-axle (e.g., half-axle 36) to overrun the rotational speed of the inner wheel and the associated half-axle (e.g., half-axle 38). In certain embodiments, for example, during a turning operation, a control system (not depicted) may cause electrical machine 30 to speed-match with respect to the slower (i.e., the inner) wheel, as based for example, on various speed sensors. Due to the configuration of clutch assembly 34, the outer wheel may then be permitted to overrun the electrical machine, thereby allowing the outer wheel to complete the turn without slippage or back-driving of electrical machine 30. As such, for example, clutch assembly 34 may allow construction of powered axle assembly 16 without a traditional differential (other than clutch assembly 34), with respect to half-axles 36 and 38. This may accordingly reduce the cost, complexity, and/or required maintenance for a particular vehicle.

Likewise, clutch assembly 34 (e.g., with sprag clutches or mechanical diodes) may advantageously provide a fail-safe mode of operation because, due to the operation of one-way clutches 54 and 56, wheels associated with clutch assembly 34 may generally be permitted to overrun the prime mover when they are in forward motion. Further, due to the nature of one-way clutches 54 and 56, such overrun may occur even absent an associated active control system. As such, for example, the use of expensive and/or complex control systems may be avoided while still, for example, allowing for the forward towing of trailer 12 (or another relevant vehicle) without powering up and/or back-driving electrical machine 30. Similarly, the use of clutch assembly 34 may advantageously avoid the need to disengage friction elements or shift collars in order to prevent damage to electrical machine 30 (or other power source) due to overspeed, when the speed of the relevant vehicle exceeds the maximum speed at which electrical machine 30 (or other power source) can drive the axle.

The description of the present disclosure has been presented for purposes of illustration and description, but is not intended to be exhaustive or limiting to the disclosure. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described examples. Accordingly, various embodiments and implementations other than those explicitly described are within the scope of the following claims.

What is claimed is:

1. A power transfer assembly for transmitting power from a power source to a rotating component comprising:
   a power source capable of providing torque output;
   a first one-way clutch configured to receive torque input from the power source; and
   a second one-way clutch configured to receive torque input from the power source;
   wherein the first one-way clutch is further configured to transmit at least a first portion of the received torque input to a first half-axle,
   wherein the second one-way clutch is further configured to transmit at least a second portion of the received torque input to a second half-axle, and
   wherein no differential, other than the first and the second one-way clutches, is interposed between the power source and either of the first and the second half-axles for the transmission of power from the power source to either of the first and the second half-axles.

2. The power transfer assembly of claim 1, wherein at least one gear reduction is interposed between the power source and the first and second one-way clutches, the torque input being transmitted to the first and second one-way clutches via the at least one gear reduction.

3. The power transfer assembly of claim 1, wherein at least one gear reduction is interposed between the first one-way clutch and a wheel connected to the first half-axle, the first portion of the received torque input being transmitted to the wheel via the gear reduction.

4. The power transfer assembly of claim 1, wherein at least one of the first and the second one-way clutches includes a sprag clutch.

5. The power transfer assembly of claim 4, wherein each of the first and the second one-way clutches includes a sprag clutch, and
   wherein the first and the second one-way clutches include a shared input race, the shared input race being configured to receive torque input from the power source and transmit the torque input, at least in part, to both a first output race included in the first one-way clutch and a second output race included in the second one-way clutch.

6. The power transfer assembly of claim 1, wherein the power source includes an infinitely variable prime mover.

7. The power transfer assembly of claim 1, wherein the first and the second half-axles form part of a powered trailer axle.

8. The power transfer assembly of claim 1, wherein at least one of the first and the second one-way clutches includes a mechanical diode.

9. The power transfer assembly of claim 8, wherein each of the first and the second one-way clutches includes a mechanical diode, and
   wherein the first and the second one-way clutches include a shared input ring, the shared input ring being configured to receive torque input from the power source and transmit the torque input, at least in part, to both a first output ring included in the first one-way clutch and a second output ring included in the second one-way clutch.

10. A work vehicle comprising:
    a power source capable of providing torque output;
    a first one-way clutch configured to receive torque input from the power source; and
    a second one-way clutch configured to receive torque input from the power source;
    wherein the first one-way clutch is further configured to transmit at least a first portion of the received torque input to a first half-axle,
    wherein the second one-way clutch is further configured to transmit at least a second portion of the received torque input to a second half-axle, and
    wherein no differential, other than the first and the second one-way clutches, is interposed between the power source and either of the first and the second half-axles for the transmission of power from the power source to either of the first and the second half-axles.

11. The work vehicle of claim 10, wherein at least one gear reduction is interposed between the power source and the first and second one-way clutches, the torque input being transmitted to the first and second one-way clutches via the at least one gear reduction.

12. The work vehicle of claim 10, wherein at least one gear reduction is interposed between the first one-way clutch and a wheel connected to the first half-axle, the first portion of the received torque input being transmitted, respectively, to the wheel via the gear reduction.

13. The work vehicle of claim 10, wherein at least one of the first and the second one-way clutches includes a sprag clutch.

14. The work vehicle of claim 13, wherein both the first and the second one-way clutches includes a sprag clutch, and
    wherein the first and the second one-way clutches include a shared input race, the shared input race being configured to receive torque input from the power source and transmit the torque input, at least in part, to both a first output race included in the first one-way clutch and a second output race included in the second one-way clutch.

15. The work vehicle of claim 10, wherein the power source includes an infinitely variable prime mover.

16. The work vehicle of claim 10, wherein the work vehicle is a trailer and the first and the second half-axles form part of a powered axle of the trailer.

17. The work vehicle of claim 10, wherein at least one of the first and the second one-way clutches includes a mechanical diode.

18. The work vehicle of claim 17, wherein each of the first and the second one-way clutches includes mechanical diode, and
   wherein the first and the second one-way clutches include a shared input ring, the shared input ring being configured to receive torque input from the power source and transmit the torque input, at least in part, to both a first output ring included in the first one-way clutch and a second output ring included in the second one-way clutch.

19. A power transfer assembly for transmitting power from a power source to a rotating component comprising:
   a power source capable of providing torque output;
   a first one-way clutch configured to receive torque input from the power source; and
   a second one-way clutch configured to receive torque input from the power source;
   wherein the first one-way clutch is further configured to transmit at least a first portion of the received torque input to a first half-axle,
   wherein the second one-way clutch is further configured to transmit at least a second portion of the received torque input to a second half-axle, and
   wherein at least one gear reduction is interposed between at least one of the power source and the first and second one-way clutches, the torque input being transmitted to the first and second one-way clutches via the at least one gear reduction, and between the first one-way clutch and a wheel connected to the first half-axle, the first portion of the received torque input being transmitted to the wheel via the gear reduction.

20. The power transfer assembly of claim 19, wherein the first and the second one-way clutches include a shared input member, the shared input member being configured to receive torque input from the power source and transmit the torque input, at least in part, to both a first output member included in the first one-way clutch and a second output member included in the second one-way clutch.

* * * * *